Patented Aug. 14, 1934

1,969,748

UNITED STATES PATENT OFFICE 1,969,748

MANUFACTURE OF BASIC DERIVATIVES OF ANTHRAQUINONE

John Hall, Henry Charles Olpin, George Reeves, and Ernest William Kirk, Spondon, near Derby, England, assignors to Celanese Corporation of America, a corporation of Delaware No Drawing. Application January 9, 1929, Serial No. 331,390. In Great Britain January 31, 1928

12 Claims. (Cl. 260—60)

This invention relates to the manufacture of basic derivatives of anthraquinone by replacement by amino or alkylamino groups of hydroxy groups, for example in quinizarin, 1:4-amino-hydroxy-anthraquinone, 1:4:5-trihydroxyanthraquinone, 1:4:5:8-tetrahydroxyanthraquinone, alizarin Bordeaux, diaminoanthrarufin, diaminochrysazin etc.

This amidation or alkylamidation (replacement of hydroxy groups by amino or alkylamino groups) may be carried out by treating the leuco-hydroxy-anthraquinones with ammonia or alkylamines, usually under pressure.

We have found that the presence of a non-volatile inorganic alkali, for example caustic soda or other caustic alkali, considerably facilitates the condensation and moreover the quantity of alkylamine or the like required may be considerably reduced. We have further found that the amidation or alkylamidation may be carried out using the corresponding anthranols instead of the leuco bodies. Accordingly the present invention comprises a process in which the amidation and/or alkylamidation is conducted in presence of caustic soda or other non-volatile inorganic alkali.

The reduced compounds resulting from the condensation may be readily oxidized directly in the alkaline reaction liquor without the necessity for separation. The invention is however not limited to this oxidation without separation or to the use of reduced quantities of alkylamine or ammonia.

The amidation and/or alkylamidation which is preferably conducted under atmospheric pressure, though if desired increased pressure may be used, may be carried out either on the already formed reduced derivative or continuously or simultaneously with the reduction, i. e. without separation of the leuco body or anthranol.

It will thus be seen that by means of the present process a conversion of the hydroxy anthraquinone to the corresponding amidated or alkylamidated dyestuff or intermediate can take place in one operation without separation of any intermediate reduced bodies, a considerable advantage over any process hitherto proposed.

The following example illustrates the process of the invention:—

Example 800 parts of water, 75 parts of caustic soda and 105 parts of 1:2:5:8-tetrahydroxyanthraquinone are charged into a still and warmed to about 70° C. 112 parts of sodium hydrosulphite are added during ten minutes while stirring and after complete reduction 17 parts of monomethylamine (100%) i. e. rather less than 1.5 molecular equivalents, in the form of a 40–50% aqueous solution are added, the still closed up and the contents refluxed gently for 9 hours. After refluxing, the contents of the still, containing the leuco compound of the condensation product, are blown into a vat containing 45 parts of caustic soda dissolved in 1000 parts of water, and the whole heated by means of steam to 80–90° C., at which temperature 73 parts of sodium perborate are slowly dusted in during about 1 hour. The dyestuff may be isolated by precipitating with hydrochloric acid and filtering, and may finally be washed with hot water. It dyes cellulose acetate a greenish blue shade.

The above example illustrates the process of obtaining a dyestuff in one continuous operation from the hydroxyanthraquinone, but it is to be understood that it in no way limits the invention which comprises broadly amidating and/or alkylamidating in presence of caustic soda or other non-volatile inorganic alkali, whether or not the reduced bodies (leuco or anthranol) are isolated before or after the condensation.

The term "amidation" used in the appended claims is to be understood to include alkylamidation.

What we claim and desire to secure by Letters Patent is:—

1. Process for the manufacture of basic derivatives of anthraquinone, comprising effecting the amidation of reduced hydroxy-anthraquinones in presence of a non-volatile inorganic alkali.

2. Process for the manufacture of basic derivatives of anthraquinone, comprising effecting the amidation of reduced hydroxy-anthraquinones in presence of non-volatile caustic alkali.

3. Process for the manufacture of basic derivatives of anthraquinone, comprising effecting the amidation of reduced hydroxy-anthraquinones in presence of caustic soda.

4. Process for the manufacture of basic derivatives of anthraquinone, comprising effecting the amidation of reduced hydroxy-anthraquinones in presence of non-volatile caustic alkali under atmospheric pressure.

5. Process for the manufacture of basic derivatives of anthraquinone, comprising effecting the amidation of reduced hydroxy-anthraquinones in presence of non-volatile caustic alkali and oxidizing the products in the alkaline liquor.

6. Process for the manufacture of basic derivatives of anthraquinone, comprising reducing hydroxy-anthraquinones in non-volatile caustic alkaline solution, and effecting the amidation without separation therefrom.

7. Process for the manufacture of basic derivatives of anthraquinone, comprising reducing hydroxy-anthraquinones in non-volatile caustic alkaline solution, and effecting the amidation and subsequent oxidation without separation therefrom.

8. Process for the manufacture of basic derivatives of anthraquinone, comprising reducing hydroxy-anthraquinones in caustic soda solution, and effecting the amidation without separation therefrom.

9. Process for the manufacture of basic derivatives of anthraquinone, comprising reducing hydroxy-anthraquinones in caustic soda solution, and effecting the amidation and subsequent oxidation without separation therefrom.

10. Process for the manufacture of basic derivatives of anthraquinone, comprising effecting the alkyl amidation of reduced hydroxy anthraquinones in the presence of a non-volatile inorganic alkali.

11. Process for the manufacture of basic derivatives of anthraquinone comprising effecting the alkyl amidation of reduced hydroxy anthraquinones in the presence of caustic soda.

12. Process for the manufacture of basic derivatives of anthraquinone, comprising effecting the alkyl amidation of 1:2:5:8-tetra-hydroxy anthraquinone in the presence of caustic soda.

JOHN HALL.
HENRY CHARLES OLPIN.
GEORGE REEVES.
ERNEST WILLIAM KIRK.